United States Patent
Pu et al.

(10) Patent No.: US 10,753,770 B2
(45) Date of Patent: Aug. 25, 2020

(54) ELECTROMAGNETIC TYPE QUASI-ZERO STIFFNESS ABSOLUTE DISPLACEMENT SENSOR

(71) Applicant: SHANGHAI UNIVERSITY, Shanghai (CN)

(72) Inventors: Huayan Pu, Shanghai (CN); Jinglei Zhao, Shanghai (CN); Jun Luo, Shanghai (CN); Yi Sun, Shanghai (CN); Shaorong Xie, Shanghai (CN); Yan Peng, Shanghai (CN); Yi Yang, Shanghai (CN); Yuanyuan Liu, Shanghai (CN); Min Wang, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 44 days.

(21) Appl. No.: 16/183,512

(22) Filed: Nov. 7, 2018

(65) Prior Publication Data

US 2020/0141763 A1 May 7, 2020

(51) Int. Cl.
*G01D 5/20* (2006.01)
*G01H 11/02* (2006.01)

(52) U.S. Cl.
CPC ............... *G01D 5/20* (2013.01); *G01H 11/02* (2013.01)

(58) Field of Classification Search
CPC .................................. G01D 5/20; G01H 11/02
See application file for complete search history.

(56) References Cited

U.S. PATENT DOCUMENTS

2008/0105069 A1* 5/2008 Binnard ............. G03F 7/70716
74/16

OTHER PUBLICATIONS

Sun et al., A Quasi-Zero-Stiffness-Based Sensor System in Vibration Measurement, IEEE Transactions on Industrial Electronics, vol. 61, No. 10, Oct. 2014 (Year: 2014).*
Y. Wang et al., Design of a novel quasi-zero-stiffness based sensor system for measurement of absolute vibration motion, 2015 10th Asian Control Conference (ASCC), Kota Kinabalu, 2015 (Year: 2015).*
Jiao et al., A six-direction absolute displacement sensor for time-delayed control based on quasi-zero-stiffness property, International Journal of Distributed Sensor Networks, vol. 12(10), 2016 (Year: 2016).*

* cited by examiner

*Primary Examiner* — Daniel R Miller

(57) ABSTRACT

An electromagnetic type quasi-zero stiffness absolute displacement sensor that includes an intermediate shaft, upper end cover, first sliding bearing arranged on the upper end cover, upper housing fixedly connected to the upper end cover, electromagnetic coil fastened onto an inner wall of the upper housing, spiral spring, spring support connected to a lower end of the spiral spring, force sensor fastened onto a lower end surface of the spring support, lower end cover fastened onto lower end surface of the force sensor, and a lower housing connected to the lower end cover; the intermediate shaft sequentially passes through, from top down, the first sliding bearing, upper end cover, and electromagnetic coil, and is connected to an upper end of the spiral spring; and the upper housing is provided therein with a ring permanent magnet that is nested on the intermediate shaft and is not in contact with the electromagnetic coil.

8 Claims, 22 Drawing Sheets

ELECTROMAGNETIC TYPE QUASI-ZERO STIFFNESS ABSOLUTE DISPLACEMENT SENSOR

BACKGROUND OF THE INVENTION

1. Field of Invention

The present invention relates to the field of mechanical vibration measurement technologies, and in particular, to an electromagnetic type quasi-zero stiffness absolute displacement sensor.

2. Background of Related Art

In the industrial field, measurement of vibration of a mobile platform body is usually required, for example, vibration of a body of a car relative to the ground when the car is running and shake of a body of an unmanned ship relative to a water surface when the ship is sailing on a sea surface. A common practice is to install an acceleration sensor in the car body or the ship body, measure an acceleration signal by using the acceleration sensor, and perform integration on the acceleration signal to obtain a displacement signal. However, this practice has some shortcomings, for example, a cumulative error is introduced in the integration process, and a system delay is increased because some time is consumed during calculation. Another practice is to directly measure displacement by using a displacement sensor, such as a laser Doppler sensor and laser radar. However, regardless of which displacement sensor is used, costs are high and there is a relatively high operating condition requirement, and the displacement sensor cannot be used in a dusty environment or a watery environment.

SUMMARY OF THE INVENTION

To overcome the foregoing technical shortcomings, an object of the present invention is to provide an electromagnetic type quasi-zero stiffness absolute displacement sensor, where the electromagnetic type quasi-zero stiffness absolute displacement sensor not only has a simple structure, low costs, and high measurement accuracy, but also effectively avoids a problem of contact fatigue of a mechanical contact quasi-zero stiffness system, and the service life of the sensor is greatly prolonged.

To achieve the above object, the present invention provides the following technical solution: An electromagnetic type quasi-zero stiffness absolute displacement sensor is provided, where the electromagnetic type quasi-zero stiffness absolute displacement sensor includes an intermediate shaft, a force sensor, an electromagnetic negative stiffness unit, and a mechanical positive stiffness unit arranged below the electromagnetic negative stiffness unit; the electromagnetic negative stiffness unit includes a first sliding bearing, an upper end cover, an upper housing, an electromagnetic coil fastened onto an inner wall of the upper housing, where the first sliding bearing is arranged on the upper end cover, and the upper end cover is fixedly connected to the upper housing through a bolt; the mechanical positive stiffness unit includes a lower housing, a lower end cover, a spiral spring, and a spring support, where the lower end cover is fixedly connected to the lower housing through a bolt; a lower end surface of the force sensor is fastened to the lower end cover; the spring support is fastened onto an upper end surface of the force sensor through a bolt; and the spring support is connected to a lower end of the spiral spring; the intermediate shaft sequentially passes through, from top down, the first sliding bearing, the upper end cover, and the electromagnetic coil, and is connected to an upper end of the spiral spring, and the intermediate shaft is not in contact with the spring support; and a ring permanent magnet is disposed inside the upper housing; the ring permanent magnet is nested on the intermediate shaft; and the ring permanent magnet passes through the electromagnetic coil and is not in contact with the electromagnetic coil.

Alternatively, the electromagnetic type quasi-zero stiffness absolute displacement sensor further includes a second sliding bearing disposed between the upper housing and the lower housing; the intermediate shaft sequentially passes through, from top down, the first sliding bearing, the upper end cover, the electromagnetic coil, and the second sliding bearing, and is connected to the upper end of the spiral spring.

Alternatively, two electromagnetic coils are fastened onto the inner wall of the upper housing; the two electromagnetic coils are coaxial and there is a specific gap between the two electromagnetic coils in an axial direction; a thickness of the gap is an axial thickness of the single electromagnetic coil; and each electromagnetic coil is connected to an outside power source; and when currents with a same value and opposite directions pass through the electromagnetic coil, a magnetic field generated by the electromagnetic coil interacts with a magnet field generated by the ring permanent magnet to generate electromagnetic force along an axial direction of the intermediate shaft, such that relative sliding occurs between the intermediate shaft and the first sliding bearing and between the intermediate shaft and the second sliding bearing.

Alternatively, an outer diameter of the ring permanent magnet is smaller than an inner diameter of the electromagnetic coil.

Alternatively, two same ring permanent magnets nested on the intermediate shaft are disposed inside the upper housing, the permanent magnets are a first ring permanent magnet and a second ring permanent magnet, and the first ring permanent magnet is in contact with the second ring permanent magnet and the two ring permanent magnets have same polarity.

Alternatively, the electromagnetic negative stiffness unit further includes a first baffle ring and a second baffle ring nested on the intermediate shaft; and the first ring permanent magnet and the second ring permanent magnet are fastened to the intermediate shaft through the first baffle ring and the second baffle ring.

Alternatively, a cylindrical boss is arranged at an upper end of the spring support; a diameter of the cylindrical boss is smaller than an inner diameter of the spiral spring, and the cylindrical boss extends into the lower end of the spiral spring during assembly, to avoid horizontal shift of the spiral spring.

Alternatively, the mechanical positive stiffness unit further includes a third baffle ring nested on the intermediate shaft and an outer diameter of the third baffle ring is larger than an outer diameter of the spiral spring; and during assembly, the intermediate shaft extends into the upper end of the spiral spring, until the third baffle ring is in contact with the spiral spring.

According to specific embodiments provided in the present invention, the present invention discloses the following technical effects: The present invention provides an electromagnetic type quasi-zero stiffness absolute displacement sensor, where the sensor comprises an intermediate shaft, a force sensor, an electromagnetic negative stiffness unit, and a mechanical positive stiffness unit arranged below the electromagnetic negative stiffness unit; the electromagnetic negative stiffness unit comprises a first sliding bearing, an upper end cover, an upper housing, an electromagnetic coil fastened onto an inner wall of the upper housing, wherein the first sliding bearing is arranged on the upper end cover, and the upper end cover is fixedly connected to the upper housing through a bolt; the mechanical positive stiffness unit comprises a lower housing, a lower end cover, a spiral spring, and a spring support, wherein the lower end cover is fixedly connected to the lower housing through a bolt; a lower end surface of the force sensor is fastened to the lower end cover; the spring support is fastened onto an upper end surface of the force sensor through a bolt; and the spring support is connected to a lower end of the spiral spring; the intermediate shaft sequentially passes through, from top down, the first sliding bearing, the upper end cover, and the electromagnetic coil, and is connected to an upper end of the spiral spring, and the intermediate shaft is not in contact with the spring support; and a ring permanent magnet is disposed inside the upper housing; the ring permanent magnet is nested on the intermediate shaft; and the ring permanent magnet passes through the electromagnetic coil and is not in contact with the electromagnetic coil. Compared with the prior art, first, the electromagnetic type quasi-zero stiffness absolute displacement sensor provided in the present invention has a simple structure and low costs; second, in the present invention, a force sensor is used to measure elastic restoring force of a spiral spring to determine mechanical vibration, so as to improve measurement accuracy; and in addition, in the present invention, non-contact electromagnetic force is generated between an electrified electromagnetic coil and a ring permanent magnet, such that a problem of contact fatigue of a mechanical contact quasi-zero stiffness system is avoided, and the service life of the sensor is greatly prolonged.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An object of the present invention is to provide an electromagnetic type quasi-zero stiffness absolute displacement sensor, where the electromagnetic type quasi-zero stiffness absolute displacement sensor not only has a simple structure, low costs, and high measurement accuracy, but also effectively avoids a problem of contact fatigue of a mechanical contact quasi-zero stiffness system, and the service life of the sensor is greatly prolonged.

To make the foregoing objective, features, and advantages of the present invention clearer and more comprehensible, the present invention is further described in detail below with reference to the accompanying drawings and specific embodiments.

Figure 1:
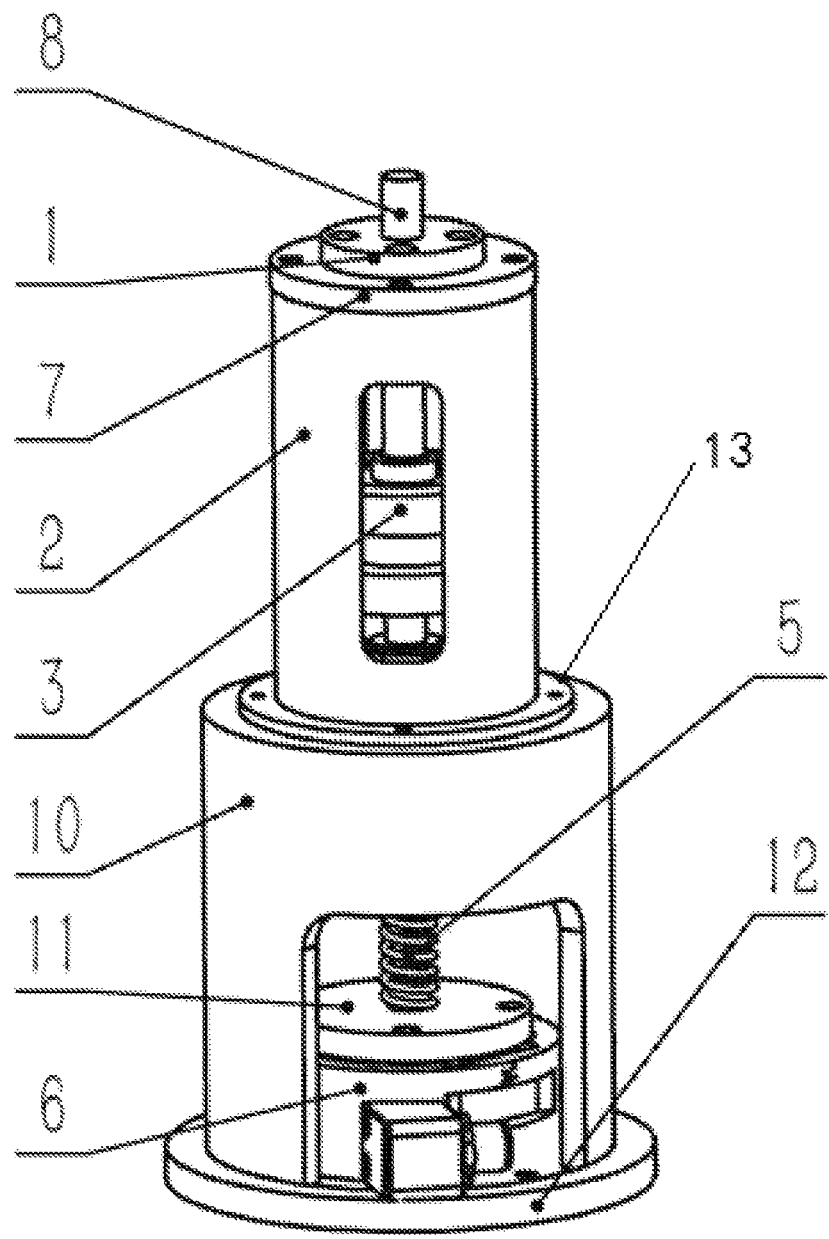
FIG. 1 is an axonometric diagram of an electromagnetic type quasi-zero stiffness absolute displacement sensor according to an embodiment of the present invention.
Figure 2:
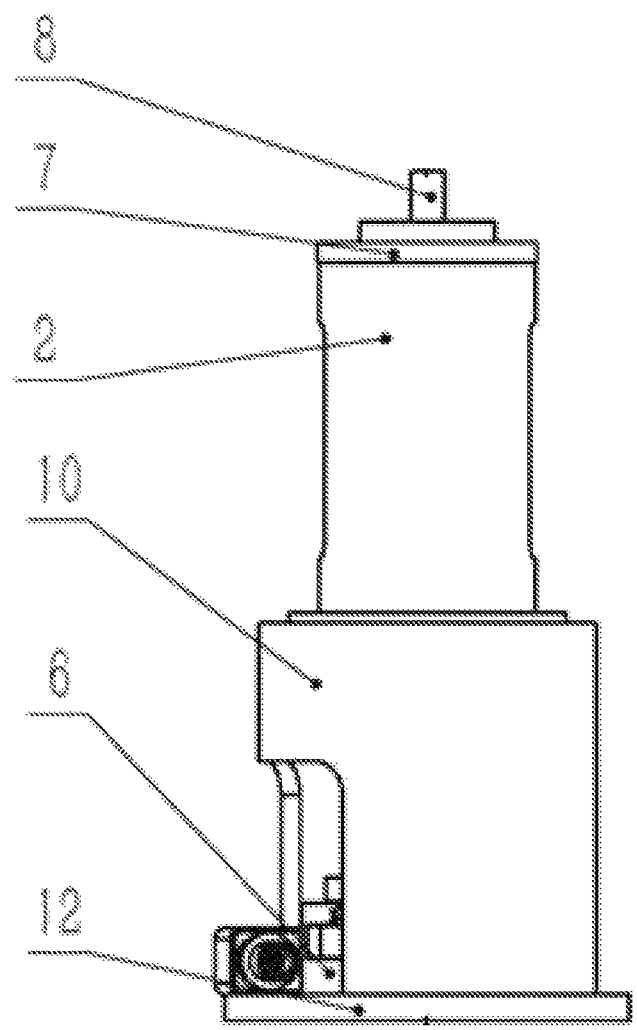
FIG. 2 is a front view of an electromagnetic type quasi-zero stiffness absolute displacement sensor according to an embodiment of the present invention.
Figure 3:
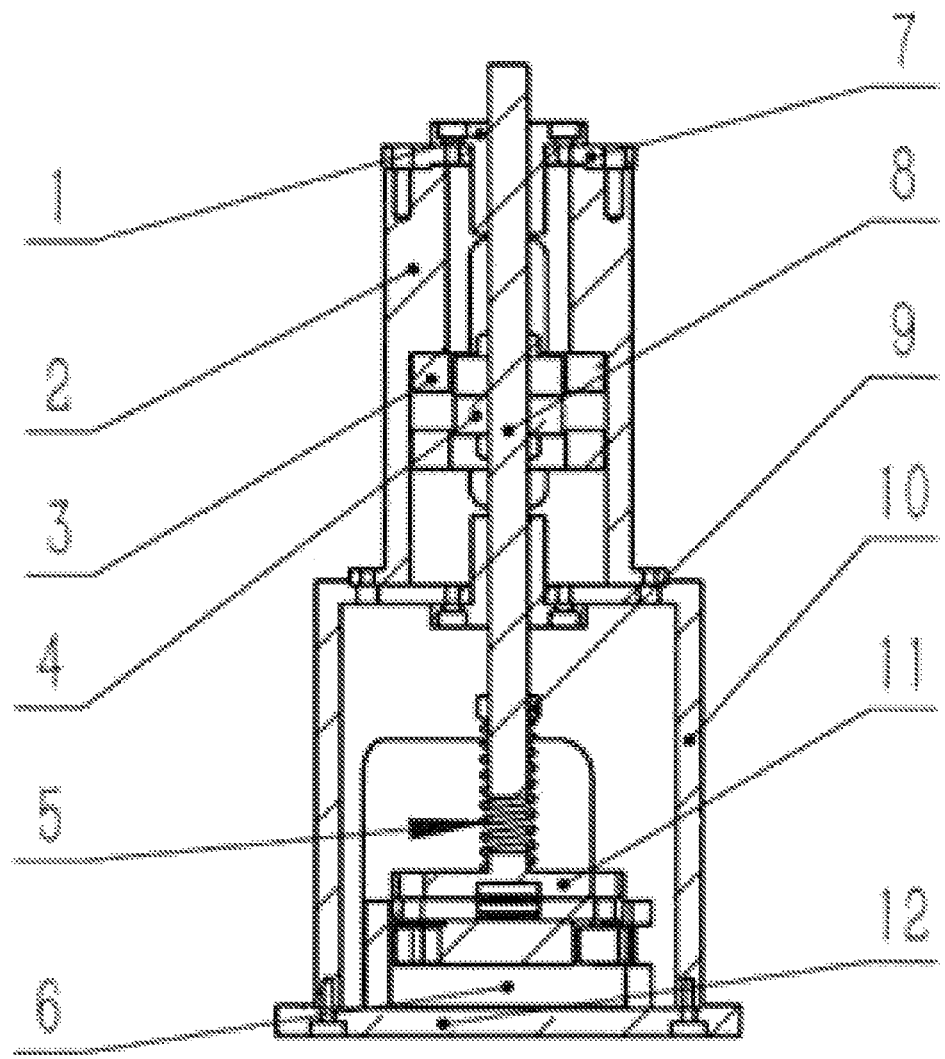
FIG. 3 is a section view of an electromagnetic type quasi-zero stiffness absolute displacement sensor according to an embodiment of the present invention.

FIG. 1 is an axonometric diagram of an electromagnetic type quasi-zero stiffness absolute displacement sensor according to an embodiment of the present invention. FIG. 2 is a front view of an electromagnetic type quasi-zero stiffness absolute displacement sensor according to an embodiment of the present invention. FIG. 3 is a section view of an electromagnetic type quasi-zero stiffness absolute displacement sensor according to an embodiment of the present invention.

Referencing FIG. 1 to FIG. 3, the electromagnetic type quasi-zero stiffness absolute displacement sensor provided in an embodiment of the present invention includes a first sliding bearing 1, an upper housing 2, an electromagnetic coil 3, a ring permanent magnet 4, a spiral spring 5, a force sensor 6, an upper end cover 7, an intermediate shaft 8, a third baffle ring 9, a lower housing 10, a spring support 11, a lower end cover 12, and a second sliding bearing 13. The first sliding bearing 1 is arranged on the upper end cover 7; the upper end cover 7 is fixedly connected to the upper housing 2 through a bolt; the electromagnetic coil 3 is fastened onto an inner wall of the upper housing 2; a lower end of the spiral spring 5 is connected to the spring support 11; the spring support 11 is fastened onto an upper end surface of the force sensor 6 through a bolt; a lower end surface of the force sensor 6 is fastened to the lower end cover 12; and the lower end cover 12 is fixedly connected to the lower housing 10 through a bolt. The second sliding bearing 13 is disposed between the upper housing 2 and the lower housing 10, and the upper housing 2 is fixedly connected to the lower housing 10 through a bolt. The intermediate shaft 8 sequentially passes through, from top down, the first sliding bearing 1, the upper end cover 7, and the electromagnetic coil 3, and the second sliding bearing 13, and is connected to an upper end of the spiral spring 5, and the intermediate shaft 8 is not in contact with the spring support 11.

The ring permanent magnet 4 is disposed inside the upper housing 2; the ring permanent magnet 4 is nested on the intermediate shaft 8; and the ring permanent magnet 4 passes through the electromagnetic coil 3 and is not in contact with the electromagnetic coil 3.

Preferably, two electromagnetic coils 3 are fastened onto the inner wall of the upper housing; the two electromagnetic coils 3 are coaxial and there is a specific gap between the two electromagnetic coils 3 in an axial direction; a thickness of the gap is an axial thickness of the single electromagnetic coil; and each electromagnetic coil 3 is connected to an outside power source; and when currents with a same value and opposite directions pass through the electromagnetic coil 3, a magnetic field generated by the electromagnetic coil 3 interacts with a magnet field generated by the ring permanent magnet 4 to generate electromagnetic force along an axial direction of the intermediate shaft 8, such that relative sliding occurs between the intermediate shaft 8 and the first sliding bearing 1 and between the intermediate shaft 8 and the second sliding bearing 13. An outer diameter of the ring permanent magnet 4 is smaller than an inner diameter of the electromagnetic coil 3.

Preferably, two same ring permanent magnets 4 nested on the intermediate shaft 8 are disposed inside the upper housing 2, the permanent magnets are a first ring permanent magnet and a second ring permanent magnet, and the first ring permanent magnet is in contact with the second ring permanent magnet and the two ring permanent magnets have same polarity. An outer diameter of the ring permanent magnet 4 is smaller than an inner diameter of the electromagnetic coil 3.

In a use process, the electromagnetic type quasi-zero stiffness absolute displacement sensor provided in this embodiment of the present invention is placed on a to-be-measured surface, and the lower end cover 12 is fastened onto the to-be-measured surface and there is no relative displacement between the lower end cover 12 and the to-be-measured surface.

To better describe an electromagnetic type quasi-zero stiffness absolute displacement sensor provided in the present invention, the electromagnetic type quasi-zero stiffness absolute displacement sensor is divided into an electromagnetic negative stiffness unit, a mechanical positive stiffness unit, and a force measurement unit according to functions.

Figure 4:
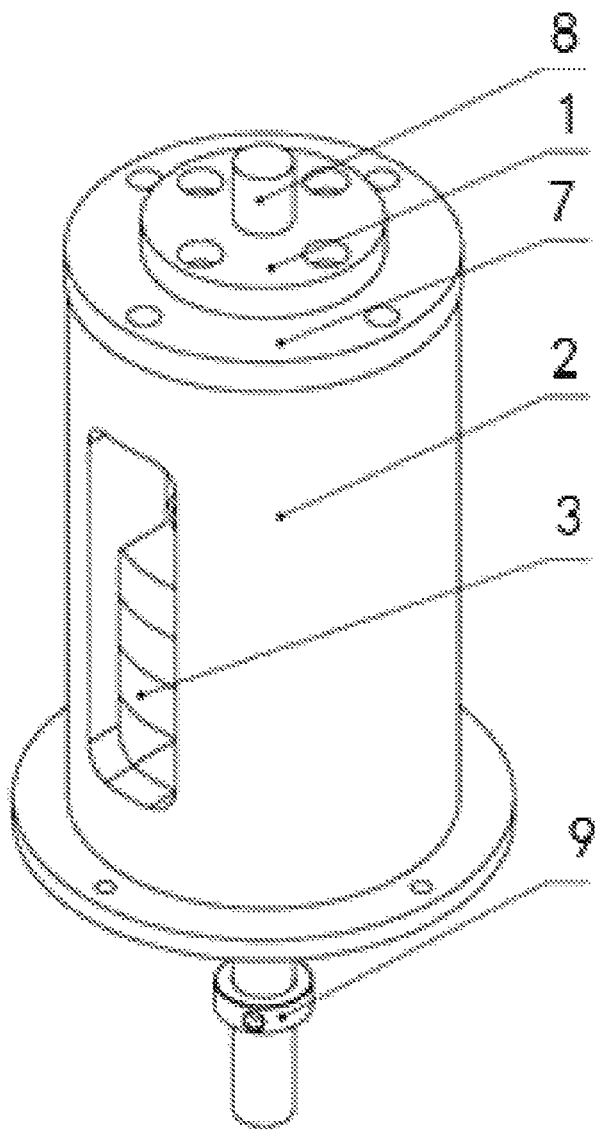
FIG. 4 is an axonometric diagram of an electromagnetic negative stiffness unit according to an embodiment of the present invention.
Figure 5:
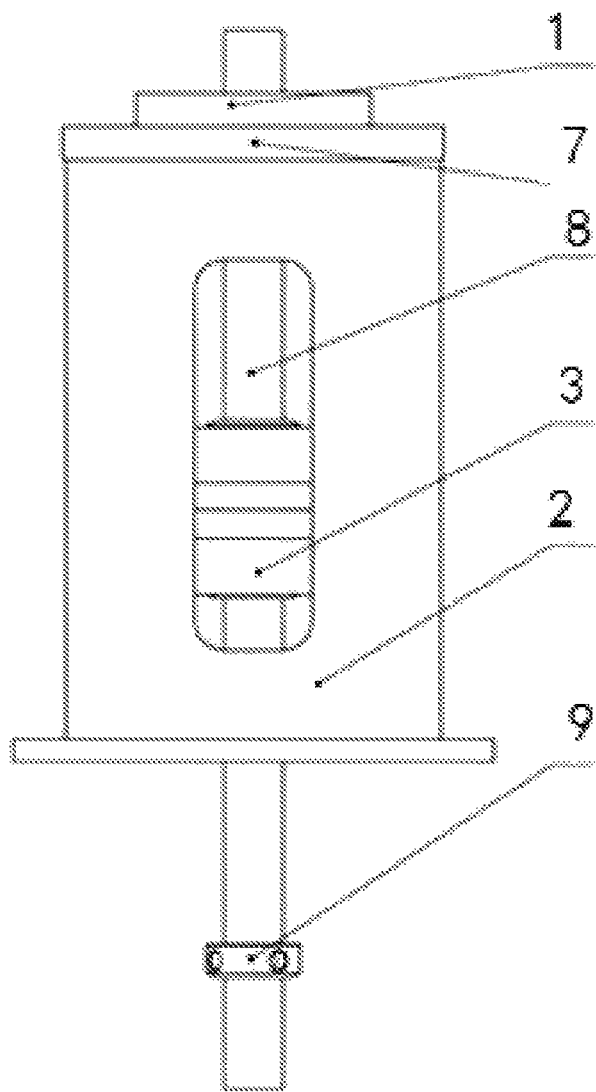
FIG. 5 is a front view of an electromagnetic negative stiffness unit according to an embodiment of the present invention.
Figure 6:
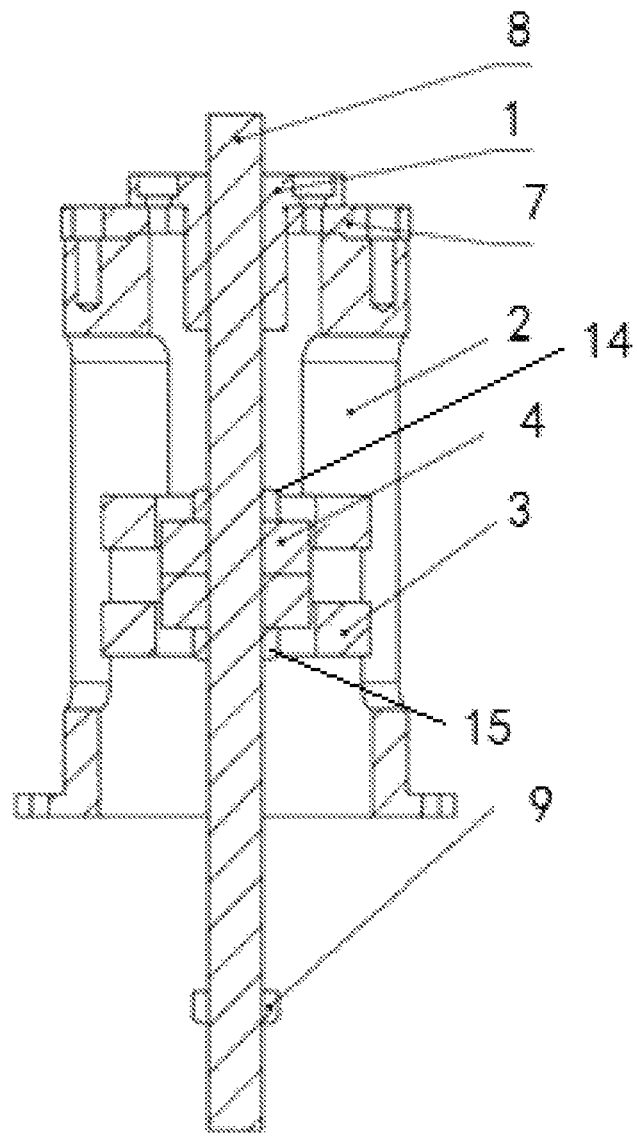
FIG. 6 is a section view of an electromagnetic negative stiffness unit according to an embodiment of the present invention.

FIG. 4 is an axonometric diagram of an electromagnetic negative stiffness unit according to an embodiment of the present invention. FIG. 5 is a front view of an electromagnetic negative stiffness unit according to an embodiment of the present invention. FIG. 6 is a section view of an electromagnetic negative stiffness unit according to an embodiment of the present invention.

Referring to FIG. 4 to FIG. 6, the electromagnetic negative stiffness unit includes the intermediate shaft 8, the first sliding bearing 1, the second sliding bearing 13, the upper end cover 7, the upper housing 2, two ring permanent magnets 4, two electromagnetic coils 3, a first baffle ring 14, and a second baffle ring 15.

Figure 7:
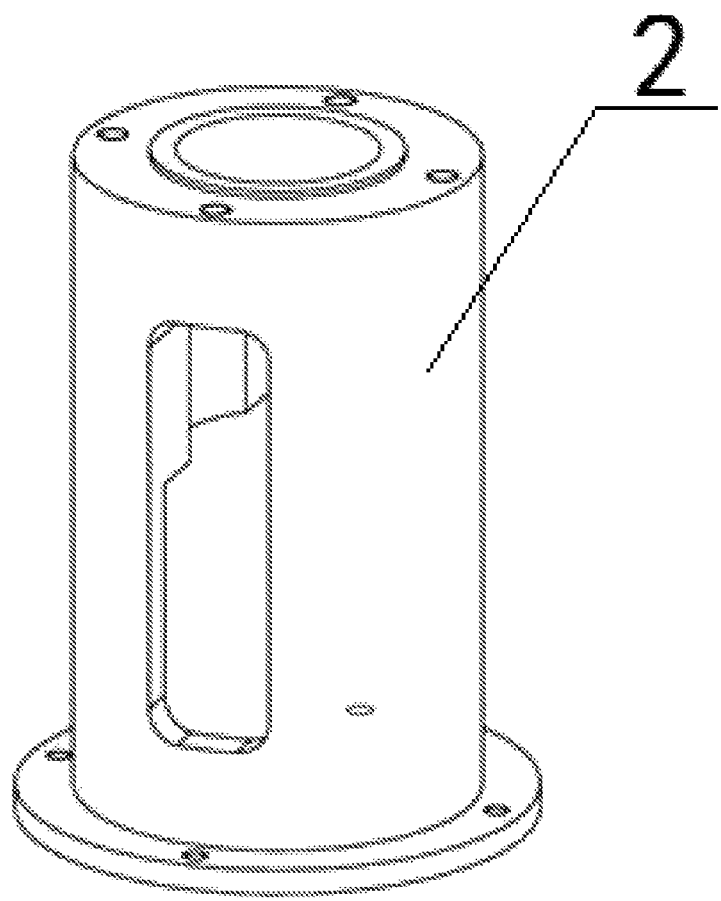
FIG. 7 is an axonometric diagram of an upper housing according to an embodiment of the present invention.
Figure 8:
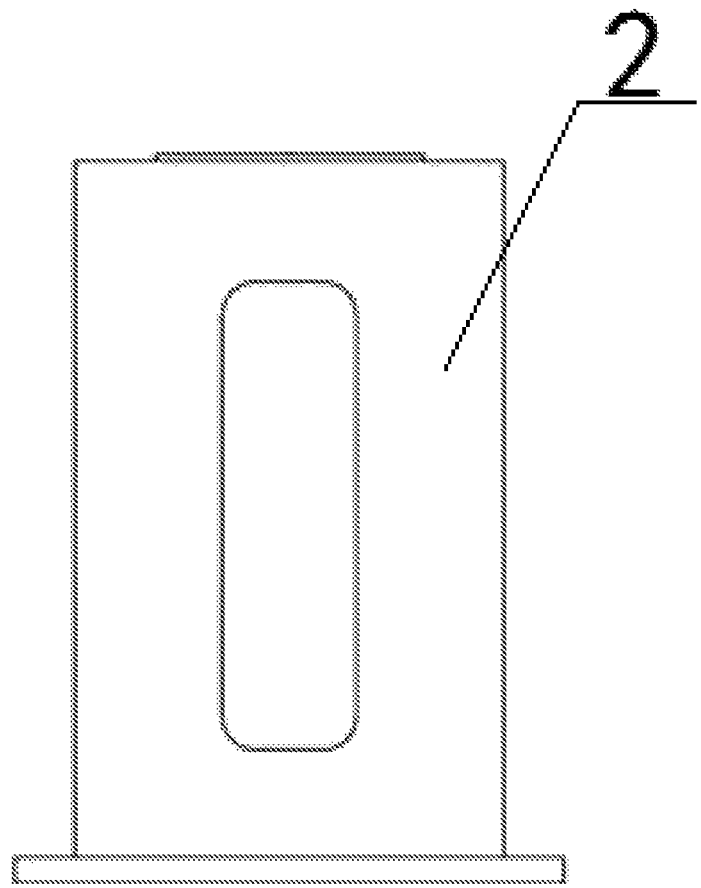
FIG. 8 is a main view of an upper housing according to an embodiment of the present invention.
Figure 9:
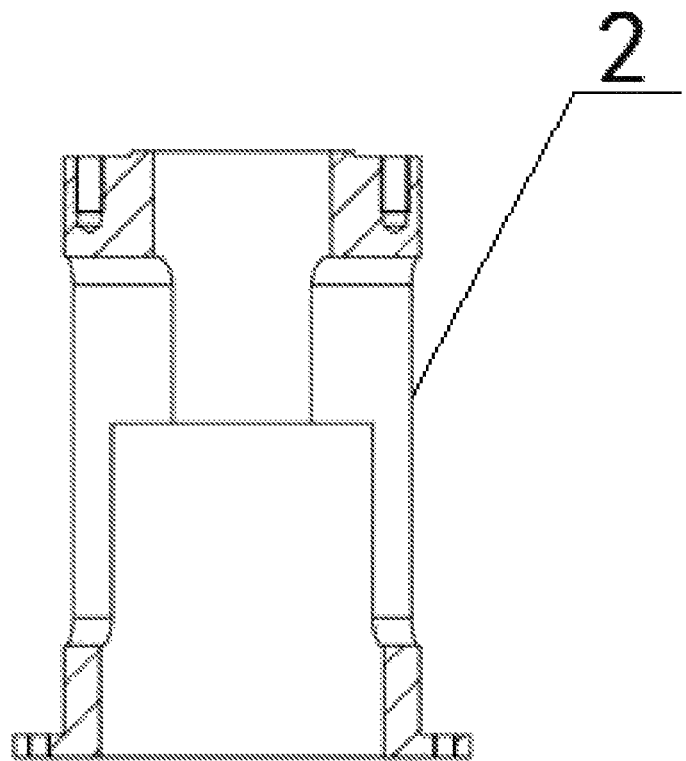
FIG. 9 is a section view of an upper housing according to an embodiment of the present invention.

A structure of the upper housing 2 is shown in FIG. 7 to FIG. 9. Both the first baffle ring 14 and the second baffle ring 15 are nested on the intermediate shaft 8; the two ring permanent magnets 4 are both disposed inside the upper housing 2 and nested on the intermediate shaft 8; the two ring permanent magnets 4 are a first ring permanent magnet and a second ring permanent magnet; and the first ring permanent magnet and the second ring permanent magnet are fastened to the intermediate shaft 8 through the first baffle ring 14 and the second baffle ring 15.

The two electromagnetic coils 3 are both fastened onto an inner wall of the upper housing 2, both the electromagnetic coils 3 are connected to an outside power source, and when currents with a same value and opposite directions pass through the two electromagnetic coils 3, a magnetic field generated by the electromagnetic coil 3 interacts with a magnet field generated by the ring permanent magnet 4 to generate electromagnetic force along an axial direction of the intermediate shaft 8; because the intermediate shaft 8 passes through the first sliding bearing 1, the electromagnetic coil 3, and the second sliding bearing 13, such that relative sliding occurs between the intermediate shaft 8 and the first sliding bearing 1 and between the intermediate shaft 8 and the second sliding bearing 13. A magnitude of the electromagnetic force is related to a value of a current of the electromagnetic coil 3, and a direction of the electromagnetic force is determined by a direction of the current. To avoid motion interference, an outer diameter of the ring permanent magnet 4 is smaller than an inner diameter of the electromagnetic coil 3.

Figure 10:
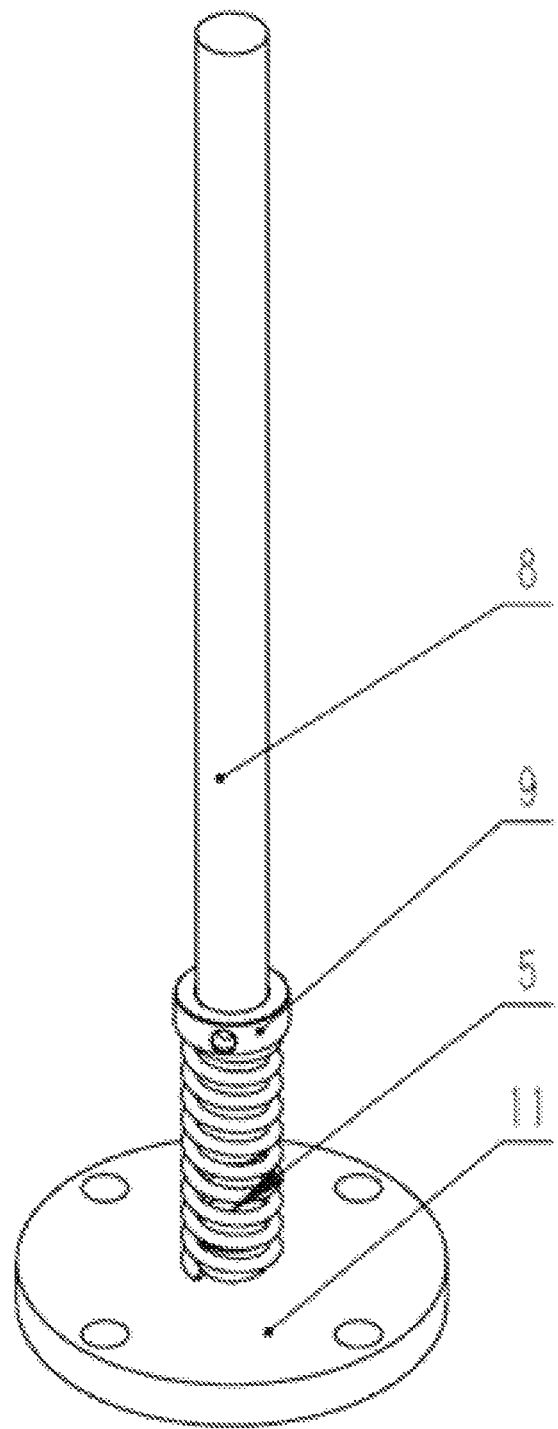
FIG. 10 is an axonometric diagram of a mechanical positive stiffness unit according to an embodiment of the present invention.
Figure 11:
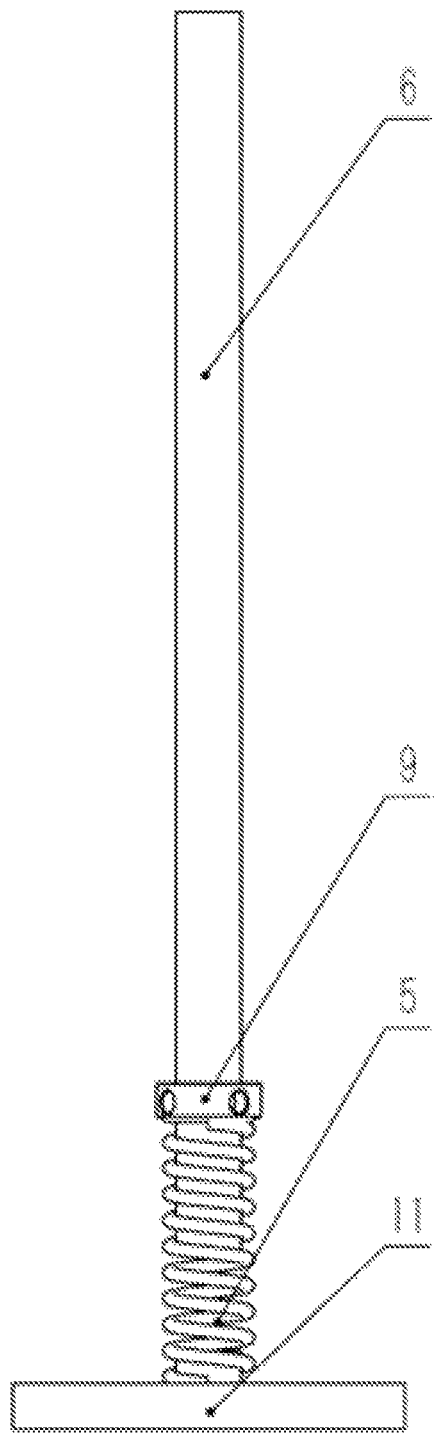
FIG. 11 is a main view of a mechanical positive stiffness unit according to an embodiment of the present invention.
Figure 12:
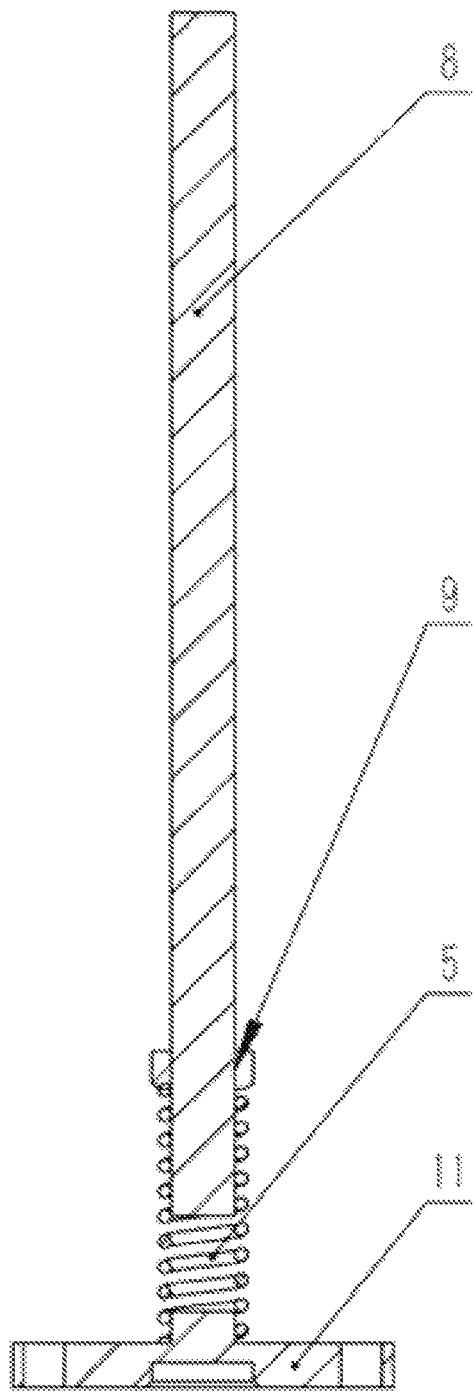
FIG. 12 is a section view of a mechanical positive stiffness unit according to an embodiment of the present invention.

FIG. 10 is an axonometric diagram of a mechanical positive stiffness unit according to an embodiment of the present invention. FIG. 11 is a main view of a mechanical positive stiffness unit according to an embodiment of the present invention. FIG. 12 is a section view of a mechanical positive stiffness unit according to an embodiment of the present invention.

Referring to FIG. 10 to FIG. 12, the mechanical positive stiffness unit includes the spiral spring 5, the spring support 11, the intermediate shaft 8, and the third baffle ring 9.

Figure 13:
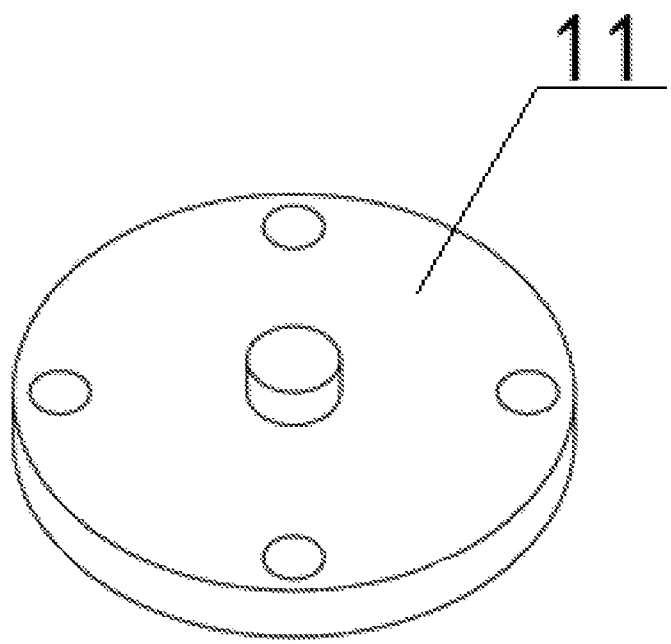
FIG. 13 is an axonometric diagram of a spring support according to an embodiment of the present invention.
Figure 14:
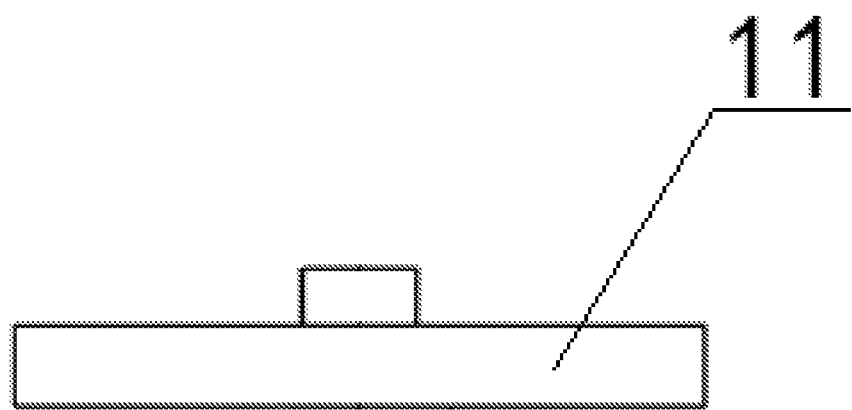
FIG. 14 is a main view of a spring support according to an embodiment of the present invention.
Figure 15:
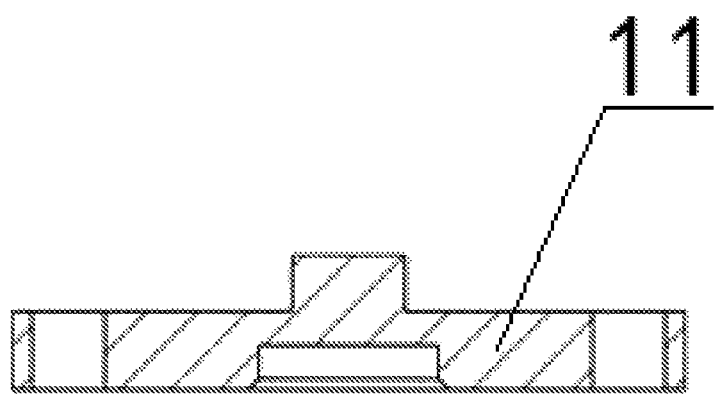
FIG. 15 is a section view of a spring support according to an embodiment of the present invention.

FIG. 13 is an axonometric diagram of a spring support according to an embodiment of the present invention. FIG. 14 is a main view of a spring support according to an embodiment of the present invention. FIG. 15 is a section view of a spring support according to an embodiment of the present invention.

Referring to FIG. 13 to FIG. 15, a cylindrical boss is disposed at an upper end of the spring support 11 through processing, and a diameter of the cylindrical boss is smaller than an inner diameter of the spiral spring 5. The cylindrical boss extends into a lower end of the spiral spring 5 during assembly, to avoid horizontal shift of the spiral spring 5.

Figure 16:
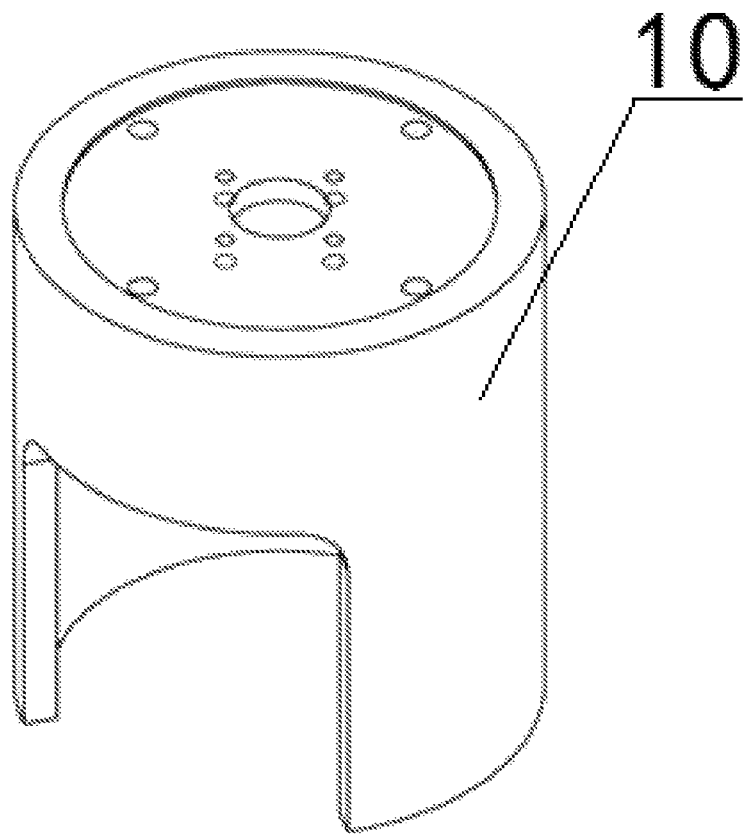
FIG. 16 is an axonometric diagram of a lower housing according to an embodiment of the present invention.
Figure 17:
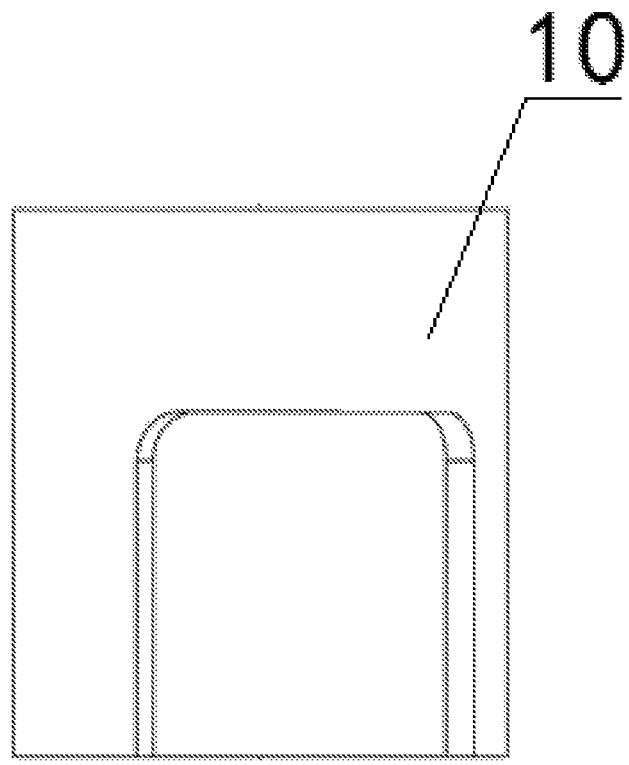
FIG. 17 is a main view of a lower housing according to an embodiment of the present invention.
Figure 18:
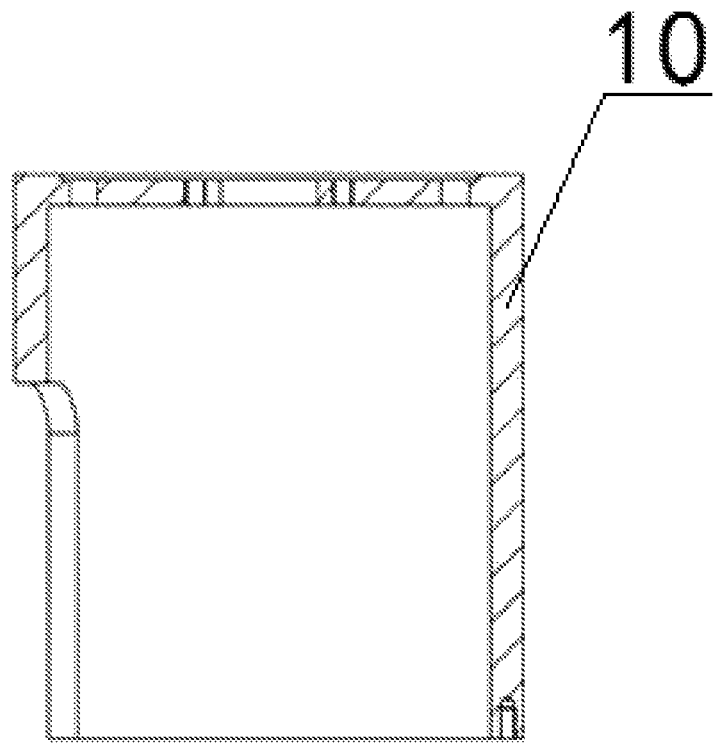
FIG. 18 is a section view of a lower housing according to an embodiment of the present invention.

The third baffle ring 9 is fastened to the intermediate shaft 8, and there is no relative movement between the third baffle ring 9 and the intermediate shaft 8. During assembly, the intermediate shaft 8 extends into the spiral spring 5, until the third baffle ring 9 is in contact with the spiral spring 5. An outer diameter of the third baffle ring 9 is larger than an outer diameter of the spiral spring 5. When the intermediate shaft 8 is in relative movement, because the third baffle ring 9 is in contact with the spiral spring 5, the third baffle ring 9 and the spiral spring 5 extrude each other, such that restoring force generated by the spiral spring 5 may be applied to the intermediate shaft 8. A structure of the lower housing 10 is shown in FIG. 16 to FIG. 18.

Figure 19:
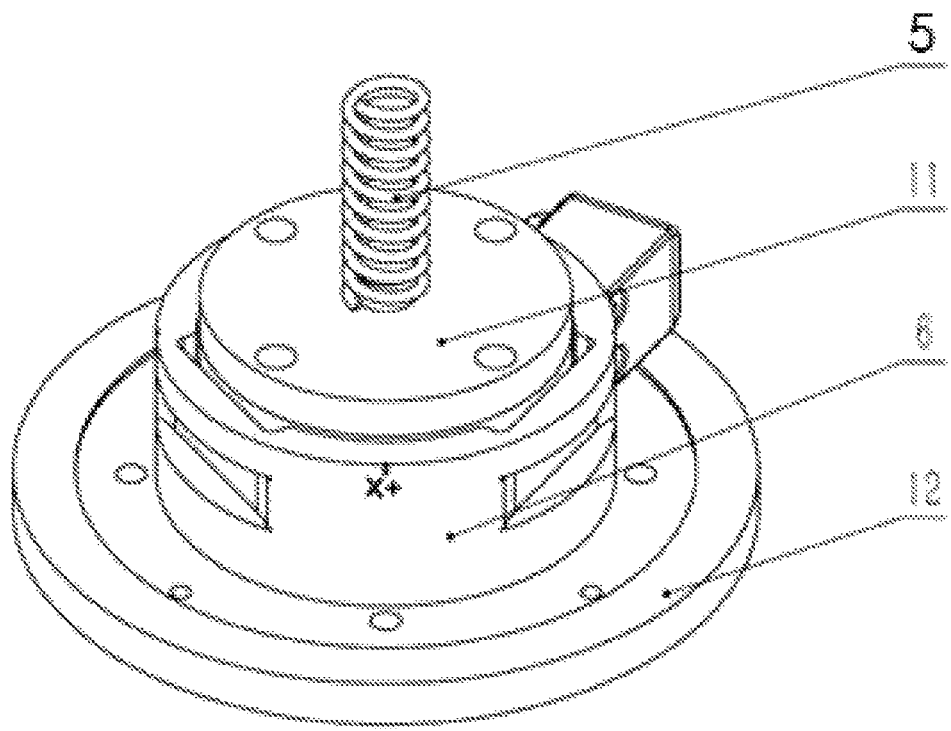
FIG. 19 is an axonometric diagram of a force measuring unit according to an embodiment of the present invention.
Figure 20:
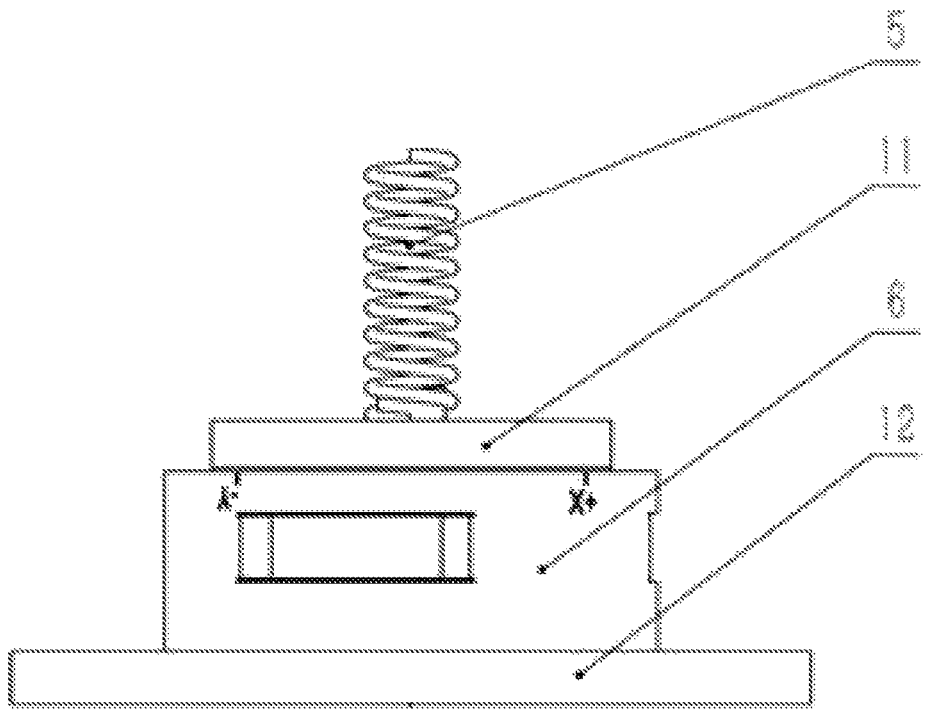
FIG. 20 is a main view of a force measuring unit according to an embodiment of the present invention.
Figure 21:
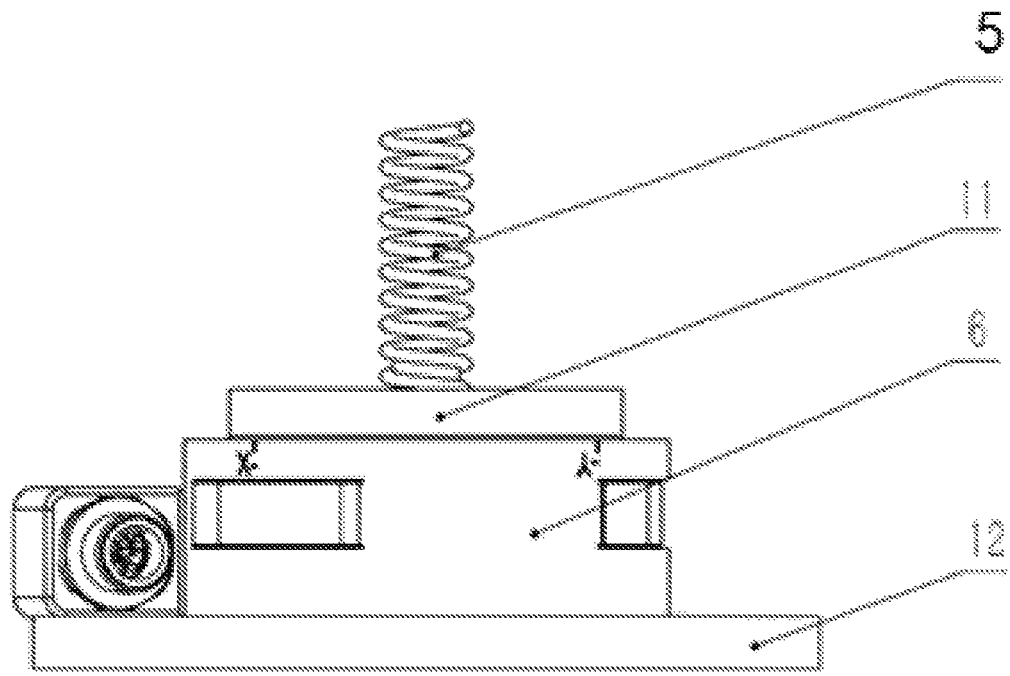
FIG. 21 is a section view of a force measuring unit according to an embodiment of the present invention.

FIG. 19 is an axonometric diagram of a force measuring unit according to an embodiment of the present invention. FIG. 20 is a main view of a force measuring unit according to an embodiment of the present invention. FIG. 21 is a section view of a force measuring unit according to an embodiment of the present invention.

Referring to FIG. 19 to FIG. 21, the force measuring unit includes the spiral spring 5, the spring support 11, the force sensor 6, and the lower end cover 12.

When the electromagnetic type quasi-zero stiffness absolute displacement sensor provided in the present invention works, due to axial movement of the intermediate shaft 8, the spiral spring 5 is deformed and generates elastic restoring force; and the force may be measured by the force sensor 6.

When the electromagnetic type quasi-zero stiffness absolute displacement sensor works, assuming that absolute displacement of a to-be-measured surface is $x_b$, and absolute displacement of the intermediate shaft 8 is $x_m$, relative displacement of the intermediate shaft 8 relative to the to-be-measured surface is $$\Delta x = x_m - x_b \quad (1).$$

When the electromagnetic type quasi-zero stiffness absolute displacement sensor works, assuming that a deformation value of the spiral spring 5 is equal to the relative displacement $\Delta x$ of the intermediate shaft 8. Assuming that stiffness of the spiral spring 5 is $K_s$, the elastic restoring force generated by the spiral spring 5 due to its deformation is $$F_s = K_s \cdot \Delta x = K_s(x_m - x_b) \quad (2).$$

When the electromagnetic type quasi-zero stiffness absolute displacement sensor works, resultant force applied to the intermediate shaft 8 is equal to resultant force of electromagnetic force $F_e$ and the elastic restoring force $F_s$. A value and a direction of a current are adjusted to make the electromagnetic force $F_e$ and the elastic restoring force $F_s$ have a same magnitude and different directions, that is, $F=F_s-F_e=0$. In this case, axial resultant force of a system is 0, positive stiffness provided by the spiral spring 5 cancels negative stiffness generated by an electromagnetic field, and system comprehensive stiffness is 0, so as to implement quasi-zero stiffness. When the system comprehensive stiffness reaches 0, regardless of how the to-be-measured surface moves, movement is not transferred to the intermediate shaft 8, that is, the intermediate shaft 8 keeps absolutely stationary, and the following relationship holds:

$$x_m = 0 \quad (3).$$

When the electromagnetic type quasi-zero stiffness absolute displacement sensor works, based on simultaneous equations (2) and (3), there is the following relationship $$F_s = -K_s x_b \quad (4).$$

When the electromagnetic type quasi-zero stiffness absolute displacement sensor works, the elastic restoring force $F_s$ generated by the spiral spring 5 may be measured by the force sensor 6, and absolute displacement $x_b$ of the to-be-measured surface is calculated according to Formula (4):

$$x_b = -\frac{F_s}{K_s}. \quad (5)$$

Figure 22:
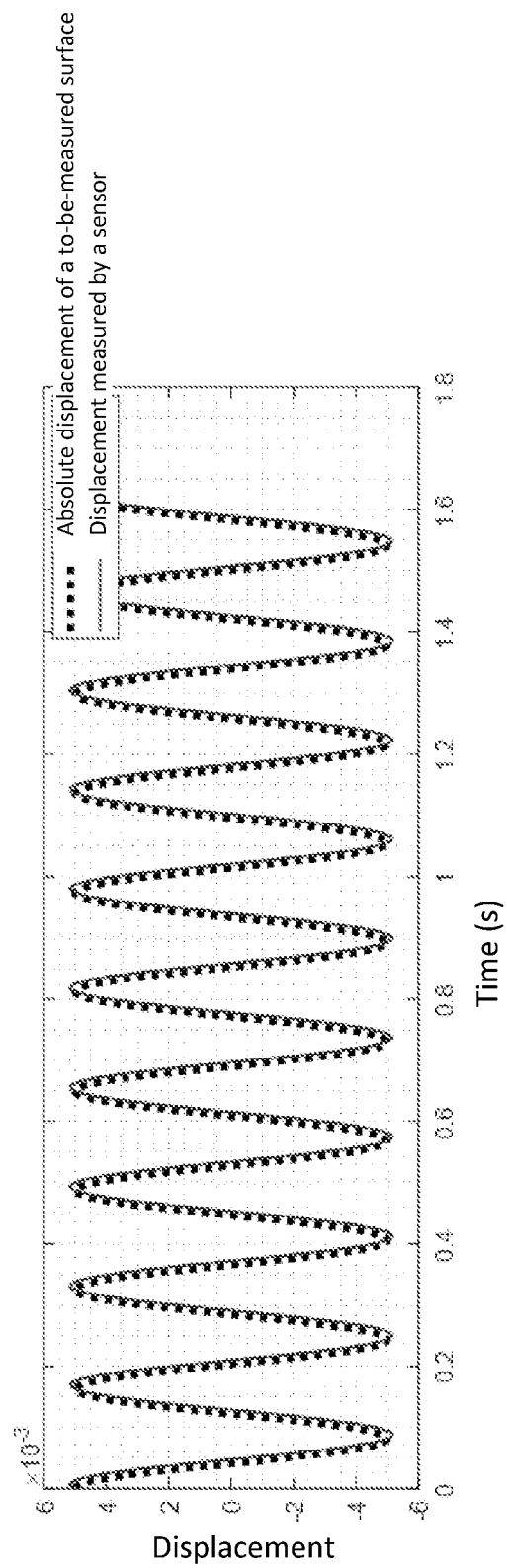
FIG. 22 is a diagram of comparison between data measured by a sensor provided in the present invention and absolute displacement of a to-be-measured surface.

As shown in FIG. 22, when an electromagnetic type quasi-zero stiffness absolute displacement sensor works, a to-be-measured surface performs simple harmonic motion. That data measured by the electromagnetic type quasi-zero stiffness absolute displacement sensor is consistent with actual displacement of the to-be-measured surface shows measurement reliability of the electromagnetic type quasi-zero stiffness absolute displacement sensor.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

We claim:

1. An electromagnetic type quasi-zero stiffness absolute displacement sensor, wherein the electromagnetic type quasi-zero stiffness absolute displacement sensor comprises an intermediate shaft, a force sensor, an electromagnetic negative stiffness unit, and a mechanical positive stiffness unit arranged below the electromagnetic negative stiffness unit;

the electromagnetic negative stiffness unit comprises a first sliding bearing, an upper end cover, an upper housing, a plurality of electromagnetic coils fastened onto an inner wall of the upper housing, wherein the first sliding bearing is arranged on the upper end cover, and the upper end cover is fixedly connected to the upper housing through a bolt;

the mechanical positive stiffness unit comprises a lower housing, a lower end cover, a spiral spring, and a spring support, wherein the lower end cover is fixedly connected to the lower housing through a bolt; a lower end surface of the force sensor is fastened to the lower end cover; the spring support is fastened onto an upper end surface of the force sensor through a bolt; and the spring support is connected to a lower end of the spiral spring;

the intermediate shaft sequentially passes through, from top down, the first sliding bearing, the upper end cover, and the plurality of electromagnetic coils, and is connected to an upper end of the spiral spring, and the intermediate shaft is not in contact with the spring support; and a ring permanent magnet is disposed inside the upper housing; the ring permanent magnet is nested on the intermediate shaft; and the ring permanent magnet passes through the plurality of electromagnetic coils and is not in contact with the plurality of electromagnetic coils.

2. The electromagnetic type quasi-zero stiffness absolute displacement sensor according to claim 1, wherein the electromagnetic type quasi-zero stiffness absolute displacement sensor further comprises a second sliding bearing disposed between the upper housing and the lower housing; the intermediate shaft sequentially passes through, from top down, the first sliding bearing, the upper end cover, the plurality of electromagnetic coils, and the second sliding bearing, and is connected to the upper end of the spiral spring.

3. The electromagnetic type quasi-zero stiffness absolute displacement sensor according to claim 2, wherein the plurality of electromagnetic coils are coaxial and there is a specific gap between the plurality of electromagnetic coils in an axial direction; a thickness of the gap is an axial thickness of one of the plurality of electromagnetic coils; and each of the plurality of electromagnetic coils is connected to an outside power source; and when currents with a same value and opposite directions pass through the plurality of electromagnetic coils, a magnetic field generated by the plurality of electromagnetic coils interacts with a magnetic field generated by the ring permanent magnet to generate electromagnetic force along an axial direction of the intermediate shaft, such that relative sliding occurs between the intermediate shaft and the first sliding bearing and between the intermediate shaft and the second sliding bearing.

4. The electromagnetic type quasi-zero stiffness absolute displacement sensor according to claim 1, wherein an outer diameter of the ring permanent magnet is smaller than an inner diameter of one of the plurality of electromagnetic coils.

5. The electromagnetic type quasi-zero stiffness absolute displacement sensor according to claim 1, wherein two same ring permanent magnets nested on the intermediate shaft are disposed inside the upper housing, the permanent magnets are a first ring permanent magnet and a second ring permanent magnet, and the first ring permanent magnet is in contact with the second ring permanent magnet and the two ring permanent magnets have same polarity.

6. The electromagnetic type quasi-zero stiffness absolute displacement sensor according to claim 5, wherein the electromagnetic negative stiffness unit further comprises a first baffle ring and a second baffle ring nested on the intermediate shaft; and the first ring permanent magnet and the second ring permanent magnet are fastened to the intermediate shaft through the first baffle ring and the second baffle ring.

7. The electromagnetic type quasi-zero stiffness absolute displacement sensor according to claim 1, wherein a cylindrical boss is arranged at an upper end of the spring support; a diameter of the cylindrical boss is smaller than an inner diameter of the spiral spring, and the cylindrical boss extends into the lower end of the spiral spring during assembly, to avoid horizontal shift of the spiral spring.

8. The electromagnetic type quasi-zero stiffness absolute displacement sensor according to claim 1, wherein the mechanical positive stiffness unit further comprises a third baffle ring nested on the intermediate shaft and an outer diameter of the third baffle ring is larger than an outer diameter of the spiral spring; and during assembly, the intermediate shaft extends into the upper end of the spiral spring, until the third baffle ring is in contact with the spiral spring.

* * * * *